United States Patent [19]
Stone

[11] 3,991,478
[45] Nov. 16, 1976

[54] MECHANISM FOR LOCATING AN OBJECT

[76] Inventor: Edward P. Stone, 4362 Whittle Ave., Oakland, Calif. 94602

[22] Filed: May 27, 1975

[21] Appl. No.: 581,125

[52] U.S. Cl. .......................... 33/174 TA; 33/164 B; 269/60
[51] Int. Cl.² ...................... G01B 5/00; B23Q 3/18; G01B 3/18
[58] Field of Search ................. 33/163, 164 B, 166, 33/170, 174 TA; 269/60, 65

[56] References Cited
UNITED STATES PATENTS

| | | |
|---|---|---|
| 1,133,652 | 3/1915 | May .................................. 33/164 B |
| 2,467,499 | 4/1949 | Sachtleber ......................... 33/164 B |
| 2,855,688 | 10/1958 | Comstock ....................... 33/174 TA |
| 3,103,827 | 9/1963 | Logan .............................. 33/164 B |
| 3,418,965 | 12/1968 | Rabinow ............................... 33/166 |
| 3,666,227 | 5/1972 | Frederick .............................. 33/170 |

Primary Examiner—Richard E. Aegerter
Assistant Examiner—Richard R. Stearns

[57] ABSTRACT

A mechanism for locating an object with respect to a surface utilizing a first and second threaded means axially moving a support for the object, and a means for summing the leads of both threaded means to produce an additive or subtractive effect, thus moving the object according to the distance resulting from the summing of the leads.

1 Claim, 4 Drawing Figures

U.S. Patent  Nov. 16, 1976  3,991,478
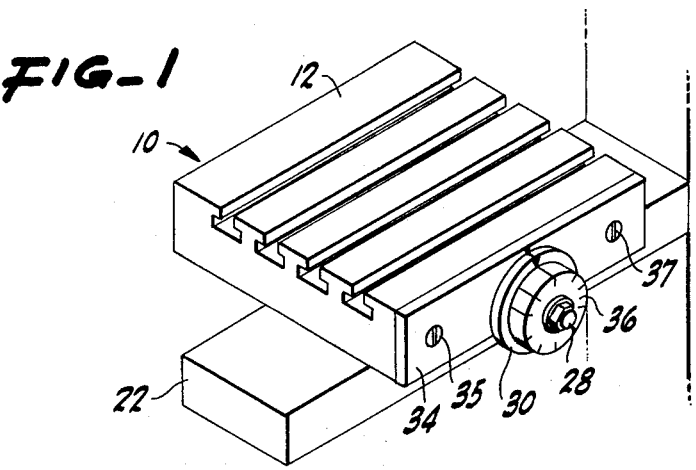
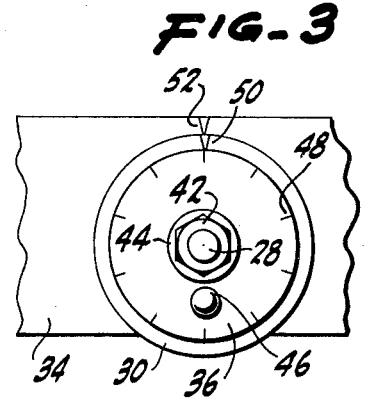
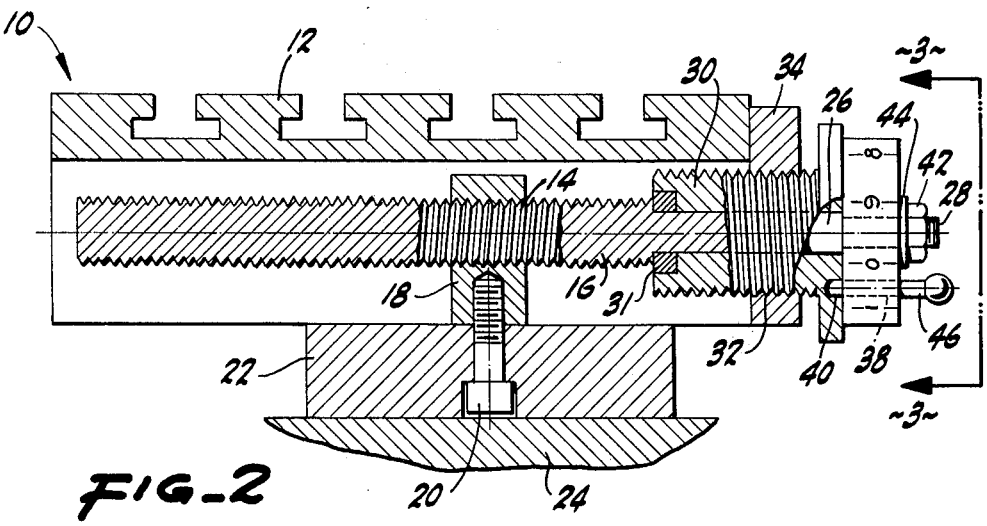
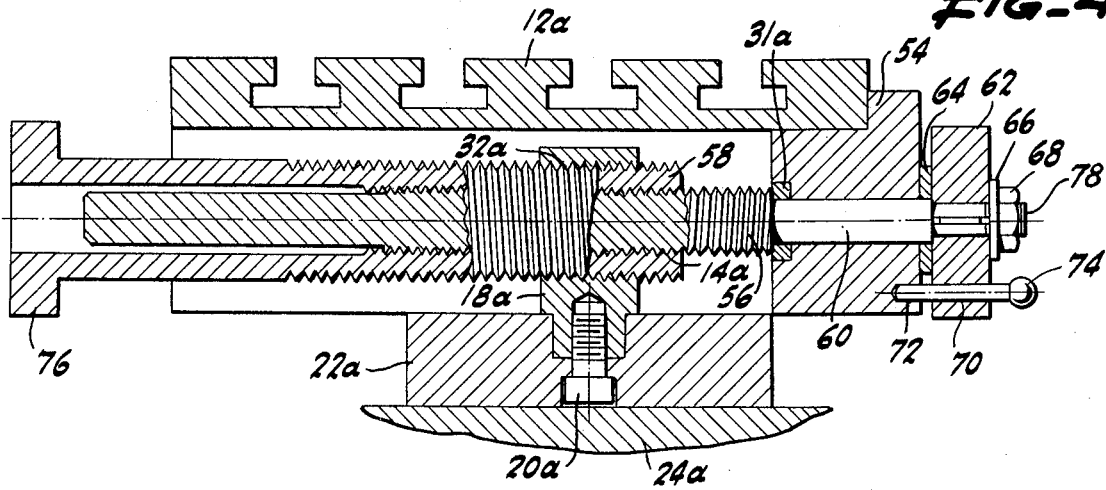

MECHANISM FOR LOCATING AN OBJECT

BACKGROUND OF THE INVENTION

The accurate positioning of an object with respect to a surface provides a necessary element in modern manufacturing processes. For instance, power machinery, whether manually or automatically manipulated, requires the placement of a workpiece in a particular position with respect to the operation performed. As is well known in the art, drill presses, lathes, and other like tools function by locating the workpiece with respect to the tool resulting in the manufacture of high quality artifacts in mass.

The disparity in measuring systems among the world nations (chiefly English and Metric) compounds the problem, since international commerce demands the use of each measuring system in every country. It is apparent that persons unfamiliar with the English system, for example, will be required to convert metric units into English units and vice versa. Such conversion reaches fruition in an ordinary factory or shop, where the worker must perform this task. In the past this process has proved a difficult one.

Likewise, the mere conversion of centimeters to inches creates many other problems in the manufacturing circles. The upshot of such measurement conversions transforms itself into extra time, labor and expense in the production process.

The known construction of positioning machines limits the accuracy to about a one degree turn of the dial. This limitation springs from the friction factors of the known devices and the physical characteristics of the human body. In other words, the average human hand and eye can only perform fine work to a certain extent.

SUMMARY OF THE INVENTION

In accordance with the present invention, a mechanism for locating or positioning an object is provided having a first threaded means capable of moving an object with respect to a reference surface and a second threaded means also capable of moving said object along the same axis as the first threaded means. The object may be held on a means for support such as a table or platform. The first and second threaded means interact such that the leads of each threaded means sum. Thus the object on the table will move a distance equal to the sum of the leads of both threaded means.

For example, the two threaded means will permit the movement of the object a distance greater or lesser than a single threaded means. In the latter configuration, such a combination will allow extremely fine adjustment in the position or location of an object with respect to a stationary surface. Also, the lead of the threaded means may be selected to allow the instant conversion of an axial distance expressed in one system of measurements to another, by simply moving the first threaded means after affixing the two threaded means together. For example, an operator of the mechanism may advance the object two inches or two centimeters simply by affixing or detaching two threaded means.

The particular embodiments of the invention will be more fully discussed as the specification continues.

In this respect, it is an object of the present invention to provide a mechanism for the accurate positioning of a object with respect to a fixed surface.

It is another object of the present invention to employ a first and second threaded means and to sum their leads to produce a resultant distance which corresponds to the distance traveled by an object in relation to a fixed surface.

It is yet another object of the present invention to provide a mechanism to finely position a workpiece to allow manipulation of the same by manual or power machinery.

It is another object of the present invention to provide a positioner for an object which simply converts a numerical representation of a distance in one system of measurements into another system of measurements.

The invention possesses other objects and advantages especially as concerns particular features and characteristics thereof, which will become apparent as the specification continues.

For a better understanding of the invention, reference is made to the following detailed description.

BRIEF DESCRIPTION OF THE DRAWINGS

FIG. 1 is a perspective view of the device.

FIG. 2 is a broken sectional view of the device.

FIG. 3 is a broken end view taken along the line 3–3 of FIG. 2.

FIG. 4 is a broken sectional view of an alternate embodiment of the device.

DESCRIPTION OF THE PREFERRED EMBODIMENTS

With reference to the drawings, the mechanism as a whole is depicted by reference character 10, FIG. 1, which includes means 12 for supporting the object. First threaded means 14 includes a first axially movable member 16 and an internally threaded bushing 18. The external threads of the member 16 threadingly engage the internal threads of the bushing 18. A threaded bolt 20 holds bushing 18 to a base member 22 supported by a fixed surface 24.

Member 16 includes a narrow leg 26 which terminates in a threaded end portion 28.

Surrounding the narrow leg 26 is second axially movable member 30. Bushing 31 interposes member 16 and 30. A second threaded means 32 consists of the external threads of the second member 30 and the internal threads of collar 34 which connects to support means 12 with machine screws 35 and 37. For practical purposes, collar 34 may be considered an extension of supporting means 12.

The device as shown in FIG. 2, possesses means for summing the leads of said first and second threaded means 14 and 32 which includes a dial 36 having an opening alignable with opening 40 of member 30. Dial 36 is circumferentially fixed to narrow leg 26 via nut 42 and washer 44, placed on threaded end portion 28. Means connecting the first member 16 to the second member 30 may take the form of a pin 46 passing through openings 38 and 40 to secure dial 36 to member 30. As is well known in the art, there are many devices which may accomplish this function, such as clutch mechanisms, set screws, mated members and the like. Thus, a turn of the dial 36 sums the leads of the first and second threaded means 14 and 32 and axially moves support means 12 according to a predetermined distance, which will be more fully discussed as the specification continues. Printed indicia 48 and mark 50 indicate alignment of openings 38 and 40. Indicia 48 and mark 52 show the axial distance moved by support means 12.

First and second threaded means 14 and 32 may be predetermined such that the summing of the leads, thereof, creates axial movement of support means 12 in either direction along the axis.

This effect is useful in converting a numerical representation of an axial distance into various systems of measurement. For example, an operator may move dial 36 0.25 centimeters or 0.25 inches by activating or inactivating the connecting means between the first and second members. In the present embodiment, the insertion of pin 46 within openings 38 and 40 could result in support means 12 moving a metric distance and removal of pin 46 could result in support means 12 moving an English distance, and vice versa.

As shown in FIG. 2, the first and second threaded means 14 and 32 may be constructed with reverse pitches. For example, the first threaded means 14 may have a left-handed pitch with a lead of 0.100 inches per 360° of rotation of member 16, i.e.: (10) threads per inch. The second threaded means 32 may have a right-handed pitch with a lead of 0.0605 inches per 360° of rotation, i.e.: (16.5) threads per inch. Using the first threaded means 14 alone would position a workpiece or object on support means 12 in accordance with the English system of distance measurement. However, summing the leads of the first and second threaded means 14 and 32 by activating the means for summing the leads would result in the support means 12 moving an axial distance numerically equal to the corresponding metric distance. That is to say, the support means 12 would move a distance equal to 0.100 inches minus 0.0605 inches, or 0.0394 inches which is equal to 0.100 centimeters.

Turning to FIG. 4, an alternate embodiment of the device is shown and reference characters with the letter "a" have been employed to indicate elements identical to those described in FIG. 2. The alternate embodiment of the device includes a support means 12a and a thrust flange 54 which is essentially integral with support means 12a. First threaded means 14a includes a first axially moveable member 56 having a threaded portion which engages the internal threads of hollow internally threaded member 58. Hollow member 58 terminates at one end thereof with hand wheel 76. Members 56 and 58 are substantially coaxial in their orientation. Second threaded means 32a includes the externally threaded portion of member 58 engaging internally threaded bushing 18a.

Bushing 18a rests upon base member 22a and is affixed thereto by threaded bolt 20a. Base member 22a rests upon fixed surface 24a.

Member 56 includes an elongated portion 60 which passes through thrust flange 54 and is affixed to hand wheel 62 by washers 64 and 66 and nut 68 on threaded portion 78, as is well known in the art. Bushing 31a interposes members 54 and 56. Hand wheel 62 may include printed indicia and reference marks (not shown) as found on dial 36 in FIG. 2.

Hand wheel 62 also contains opening 70 which aligns with opening 72 in flange 54. Means for summing the leads of the first and second threaded means 14a and 32a may take the form shown in FIG. 4 where members 54 and 56 are circumjacently disposed and a means to detachably connect the same includes a pin 74 insertable through openings 70 and 72. As previously stated, this connection may be effected in many ways.

In operation, the embodiment shown in FIGS. 1 – 3 locates an object with respect to fixed surface 24 by first placing the object on support means 12. The operator then turns dial 36 corresponding to a desired axial distance in a certain system of measurements. In keeping with the previous example, the first threaded means corresponds to the English system. Therefore, the operator removes the pin 46 from openings 38 and 40. Member 16 threadingly engages bushing 18. Axial movement of member 16 is transmitted through bushing 31, member 30 and collar 34. Wishing to move support means a metric distance of the same numerical equivalent, the operator inserts pin 46 into opening 38 and 40. The axial movement of members 16 and 30 as elements of first and second threaded means 14 and 32 would be summed according to the leads, as previously discussed. Thus, the support means 12 would move as before, but a metric distance.

The embodiment depicted by FIG. 4 would operate in a similar manner. The operator, using an English distance, would turn hand wheel 62 which turns member 56 within hollow member 58. Hollow member 58 may be steadied by grasping hand wheel 76 at this point. Thrust flange 54 and washer 64 transmit the axial motion of member 56 to support 12a.

Likewise, the operator wishing to move support 12a a metric distance would insert pin 74 within openings 70 and 72.

Turning hand wheel 76 would again result in the summing of the leads of the first and second threaded means 14a and 32a. Thus support means 12a and the object thereupon would move an axial distance equal to the sum of the leads with respect to surface 24a.

The device of the present invention may also be employed to make extremely fine adjustments in support means 12. For example, the first threaded means 14 or 14a may be constructed with a left-handed pitch with a lead of 10 threads per inch, and the second threaded means may be constructed with a right-handed pitch with a lead of 10.204 threads per inch. The summing of the leads would result in movement of support 12 equal to 0.204 threads per inch or 0.002 inches per 360° of rotation of first members 16 and 56. This fineness in adjustment would be extremely difficult or impossible with a single threaded means, known in the art.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. Mechanism for accurate location of an object with respect to a fixed surface, comprising:
   a. means for supporting the object;
   b. first threaded means for moving said supporting means in a axial direction with respect to the fixed surface, said first threaded means comprising a first member having a threaded portion and being rotatable about its axis, said first member's threaded portion threadingly engaging an internally threaded bushing supported by the fixed surface, said first member's rotation causing axial movement of said supporting means with respect to the fixed surface,
   c. second threaded means for moving said supporting means in a direction co-axially with respect to said first threaded means, said second threaded means comprising a second member having a threaded portion and being rotatable about its axis, said threaded portion threadingly engaging an internally threaded collar affixed to said supporting means, said second member circumjacently disposed relative to a portion of said first member, said second member upon rotation thereof being axially movable with respect to said supporting means;

d. means for selectively rotating only said first threaded means or both said first and second threaded means, wherein in the later case the leads of said first and second threaded means are summed such that said supporting means, and the object thereof move a distance equal to said sum of the leads of said first and second threaded means, said means for selectively rotating includes means for detachably rotatably connecting said second member to said first member;

e. said means for selectively rotating including a dial representing the axial distance traveled by said first threaded means in the English system of measurement, said leads of said first and second threaded means being predetermined such that a numerical representation of an axial distance traveled by said first threaded means in the English system of measurements corresponds to the same numeral representing an axial distance in the metric system of measurements traveled by said first and second threaded means as a result of the summing of said leads.

* * * * *